United States Patent [19]

Robinson

[11] Patent Number: 4,825,578

[45] Date of Patent: May 2, 1989

[54] PORTABLE BLIND APPARATUS

[76] Inventor: James L. Robinson, 14011 Hirschfield, Tomball, Tex. 77375

[21] Appl. No.: 199,834

[22] Filed: May 27, 1988

[51] Int. Cl.⁴ .................... A01M 31/00; E04H 15/04; E04H 15/42; E04H 15/44

[52] U.S. Cl. .......................................... 43/1; 135/90; 135/105; 135/901; 135/106

[58] Field of Search ...................... 43/1; 135/901, 902, 135/90, 105, 106; 160/123, 330

[56] References Cited

U.S. PATENT DOCUMENTS

| | | | |
|---|---|---|---|
| 2,159,273 | 5/1939 | Killinger | 135/106 |
| 3,008,477 | 11/1961 | Bester | 135/4 |
| 3,323,530 | 6/1967 | Smith | 43/1 |
| 3,498,305 | 3/1970 | Hulin | 135/902 |
| 4,129,139 | 12/1978 | Powers | 135/105 |
| 4,224,754 | 9/1980 | Derryberry | 43/1 |
| 4,364,193 | 12/1982 | Visco | 43/1 |
| 4,449,542 | 5/1984 | McSwain et al. | 135/98 |

FOREIGN PATENT DOCUMENTS 1249978 10/1971 United Kingdom .................. 135/90

Primary Examiner—Nicholas P. Godici
Assistant Examiner—William Scott Andes
Attorney, Agent, or Firm—Henderson & Sturm

[57] ABSTRACT

A collapsible blind apparatus (10) adapted to be suspended from an elevated limb (101) of a tree (100) wherein the blind apparatus (10) includes: a generally tubular enclosure unit (11) having a plurality of generally circular stiffening members (24) operatively attached to the periphery of the enclosure unit (11); and, a suspension unit (13) including a ring member (27) and a lanyard member (28) operatively secured to the top of the enclosure unit (11) for suspending the enclosure unit (11) from the limb (101) of a tree.

1 Claim, 1 Drawing Sheet

U.S. Patent    May 2, 1989    4,825,578
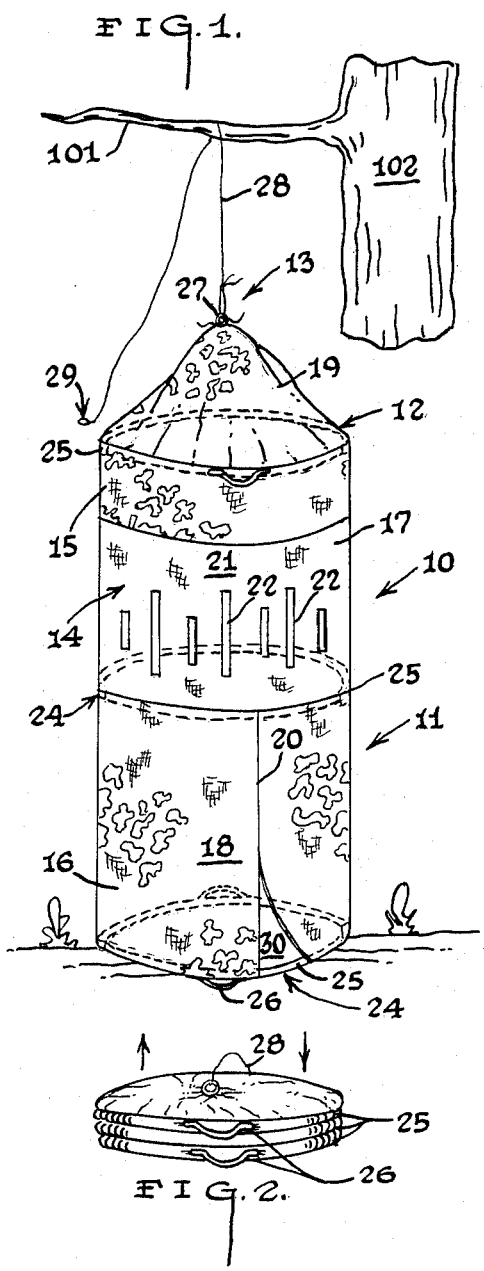
FIG. 1.
FIG. 2.
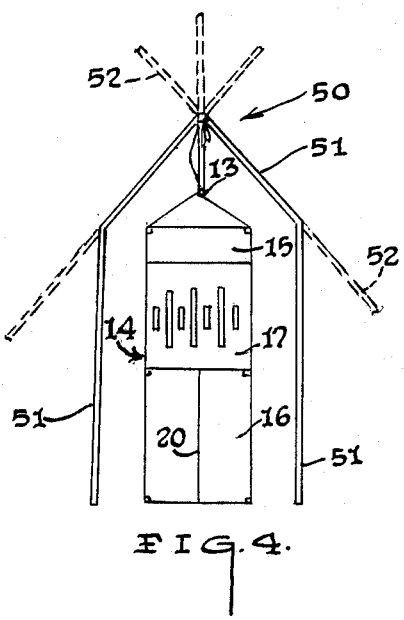
FIG. 4.
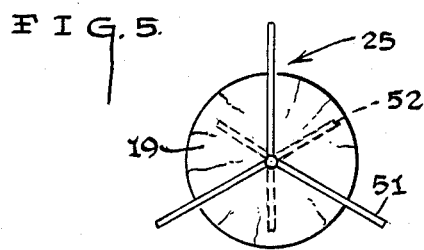
FIG. 5.
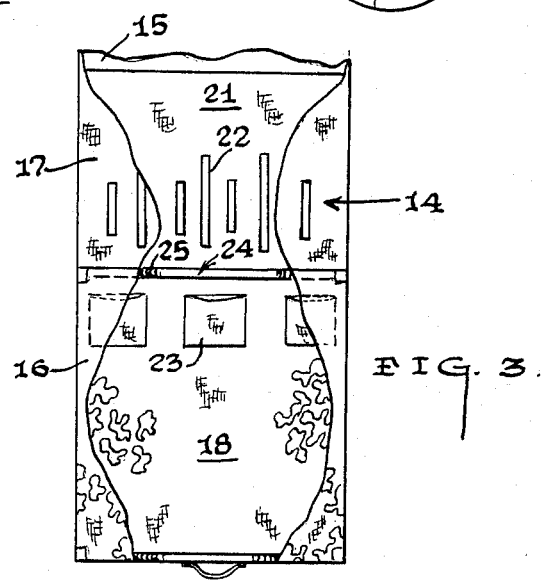
FIG. 3.

PORTABLE BLIND APPARATUS

TECHNICAL FIELD

The present invention relates generally to portable hunting blinds and more specifically to a suspension type portable blind.

Background Of The Invention

As can be seen by reference to the following U.S. Pat. Nos.: 4,364,193; 4,449,542; 3,008,477 and 4,224,754 the prior art is replete with myriad and diverse collapsible shelter and hunting blind structures.

While all of the aforementioned prior art constructions are more than adequate for the basic purpose and function for which they have been designed, they are also equally deficient in a number of common areas.

To begin with, the prior art collapsible blinds are uniformly difficult to erect due either to the large number of structural components that are required for the support framework; or, due to the fact that the hunter must inflate the walls of the structure upon finding a suitable location in the woods, fields, or marshes.

In addition, most of the prior art constructions are cumbersome to transport to a suitable habitat containing game, and even with the simplest of these structures an unobstructed 360° field of view is not possible due to the presence of manmade supporting structures or due to the configuration of the blind per se.

Needless to say, there has existed a longstanding need among hunters and others concerned with this particular area of technology for an improved collapsible blind construction that is simple to use, lightweight, easy to transport into the field, and which requires in most instances only naturally occurring materials to provide a support and suspension means for the erection of the collapsible structure.

BRIEF SUMMARY OF THE INVENTION

Briefly stated, the collapsible blind apparatus that forms the basis of the present invention comprises in general an enclosure unit, a stiffening unit, and a suspension unit.

The enclosure unit comprises in general: a generally tubular fabric envelope having generally opaque upper and lower portions and a generally transparent intermediate portion; wherein the generally opaque portions substantially conceal a hunter both from ground level and from overhead angles; while the generally transparent intermediate portion provides the hunter with a generally unobstructed 360° field of view in the horizontal plane.

The stiffening unit comprises in general: a plurality of generally circular stiffening members that are operatively disposed at spaced locations along the fabric envelope of the enclosure unit in order to maintain the tubular configuration of the enclosure unit in its erected disposition.

In addition, selected ones of the plurality of generally circular stiffening members are provided with handle elements that are used to allow one handed transport of the collapsible blind apparatus both to and from the field.

The suspension unit comprises in general: a ring and lanyard arrangement wherein a ring member is centrally secured to the opaque upper portion of the enclosure unit, and wherein a lanyard member is secured on one end to the ring member and looped over an elevated tree limb or the like; so that the blind apparatus may be suspended from the limb in the erected mode of disposition.

BRIEF DESCRIPTION OF THE DRAWINGS

These and other objects, advantages, and novel features of the invention will become apparent from the detailed description of the best mode for carrying out the preferred embodiment of this invention which follows; particularly when considered in conjunction with the accompanying drawings, wherein:

FIG. 1 is a perspective view of the preferred embodiment of the blind apparatus in the erected mode;

FIG. 2 is a perspective view of the preferred embodiment of the blind apparatus in the collapsed mode;

FIG. 3 is an enlarged detail view of the preferred embodiment;

FIG. 4 is a side elevation view of an alternate version of the preferred embodiment; and, FIG. 5 is a top plan view of the alternate embodiment.

BEST MODE FOR CARRYING OUT THE INVENTION

As can be seen by reference to the drawings and in particular to FIG. 1, the collapsible blind apparatus that forms the basis of the present invention is designated generally by reference numeral (10). The blind apparatus (10) comprises in general: an enclosure unit (11); a stiffening unit (12); and a suspension unit (13). These units will now be described in seriatim fashion.

As can best be seen by reference to FIGS. 1 and 3, the enclosure unit (11) comprises a generally tubular fabric envelope (14) having generally opaque upper (15) and lower (16) portions, and a generally transparent intermediate portion (17).

The generally opaque upper (15) and lower (16) portions of the tubular envelope (14) are preferably fabricated from camouflage material (18) so as to substantially conceal a hunter situated within the blind apparatus (10) from both ground level and overhead observation.

As can also be seen particularly by reference to FIG. 1, the upper portion (15) of the blind apparatus has a closed top cover (19); and the lower portion (16) of the blind apparatus (10) has at least one vertically disposed opening (20) to permit the ingress and egress of a hunter relative to the interior of the blind apparatus (10).

Referring back to both FIGS. 1 and 3, it can also be appreciated that the intermediate portion (17) of the tubular envelope (14) is fabricated from generally transparent netting material (21) having a plurality of vertically disposed slits (22) at spaced locations around the periphery of the intermediate portion (17); whereby, a hunter can shoot a weapon or a camera (not shown) in an unobstructed fashion from within the interior of the blind apparatus (10).

In addition, the intermediate portion (17) of the tubular envelope (14) may also be provided with an extension of the opening (20) of the lower portion (16) to facilitate the hunters access to the interior of the blind apparatus; and, the interior of the lower portion (16) of the tubular envelope (14) is further provided with a plurality of pocket members (23) which are disposed at spaced locations around the internal periphery of the fabric envelope (14).

As can best be seen by reference to FIGS. 1 and 3, the stiffening unit (12) comprises a plurality of generally circular stiffening members (24) in the form of hoops (25) that are operatively attached to the periphery of the interior of the fabric envelope (14); wherein, at least one of the stiffening members (24) is associated with the upper portion (15) of the tubular envelope (14); and, wherein at least one of the stiffening members (24) is associated with the lower portion (16) of the fabric envelope (14).

In the preferred embodiment of the blind apparatus (10) illustrated in FIGS. 1 thru 3, the stiffening members (24) comprise at least three hoops (25) wherein each of the hoops (25) are associated with one of the upper (15) lower (16) and intermediate (17) portions of the tubular envelope (14). In addition, the lower (16) and intermediate (17) portions of the fabric envelope (14) have their respective hoops (25) disposed on their lower ends; and, the upper portion (15) of the fabric envelope (14) has its hoop (25) disposed at a location spaced from the ends of the upper portions (15).

Turning now to FIGS. 1 and 2, it can also be appreciated that at least the uppermost and lowermost stiffening members (24) are further provided with handle elements (26) that will facilitate the transportation of the blind apparatus (10) to and from the field in a well recognized manner.

Still referring to FIGS. 1 and 2, it can be seen that the suspension unit (13) comprises a ring and lanyard arrangement; wherein, a ring member (27) is operatively and centrally disposed relative to the top of the upper portion (15) of the fabric envelope (14); and, wherein the elongated lanyard member (28) has one end operatively secured to the ring member (27).

As shown in FIG. 1, the erection of the preferred embodiment of the blind apparatus (10) is accomplished by looping the free end (29) of the lanyard member (28) over an elevated tree limb (101); and, then anchoring the free end (29) to the tree trunk (102) or other stable anchoring structure; such that the fabric envelope (14) will assume the generally tubular configuration depicted in FIG. 1.

It can also be appreciated that when the free end (29) of the lanyard member (28) is released from engagement with a suitable anchoring structure, the collapsible blind apparatus (10) will collapse due to gravitational forces to the configuration depicted in FIG. 2.

In addition, it should further be noted that the lower portion (16) of the fabric envelope (14) may optionally be provided with a floor panel (30) as shown in FIG. 1; whereby, the weight of the hunter on the floor panel (30) will restrain the fabric envelope (14) from lateral movement due to the effect of wind on the blind apparatus.

In the alternate version of the preferred embodiment depicted in FIGS. 4 and 5, the collapsible blind apparatus (10) would be erected at locations that do not contain live trees such as an open field or marsh; and, in these instances alternate natural and/or manmade structures (50) would have to be transported to the desired blind site.

While the basic construction of the blind apparatus (10) will remain the same, an artificially occurring support structure (50) will be required to enable the erection of the blind apparatus. These artificially occurring support structures (50) may comprise one or more generally L-shaped tubular manmade members (51) or L-shaped cut tree limbs (52) or in the alternative, a minimum of three generally straight tubular manmade members (51) or cut tree limbs (52) arranged in a tripod or teepee configuration.

Having thereby described the subject matter of this invention it should be obvious that many substitutions, modifications, and variations of the invention are possible in light of the above teachings. It is therefore to be understood that the invention as taught and described herein is only to be limited to the extent of the breadth and scope of the appended claims.

I claim:

1. A collapsible blind apparatus adapted for use with a tree having elevated limbs wherein the blind apparatus consists of:

an enclosure unit including a generally tubular fabric envelope having an upper portion, an intermediate portion, and a bottom portion wherein: at least the bottom portion is provided with a vertically disposed opening; the intermediate portion is fabricated from a generally transparent netting material, provided with a plurality of vertically disposed slits at spaced locations around the periphery of said transparent netting material; both the upper and the bottom portions of the fabric envelope are fabricated from generally opaque camouflage material; and the bottom portion of the fabric envelope is provided with a plurality of pocket members;

a support unit including a plurality of generally circular stiffening members in the form of hoops wherein at least one of the stiffening members is operatively associated with both the upper and the bottom portion respectively of said fabric envelope; and, the circular stiffening members on both the upper and the bottom portion of said fabric envelope are equipped with handle members for transporting the blind apparatus to and from the field; and, a suspension unit comprising a ring member centrally disposed on the top of the upper portion of the fabric envelope and an elongated lanyard member having one end attached to the ring member wherein the free end of the lanyard member may be looped over on of the elevated limbs of the tree to erect the collapsible blind apparatus.

* * * * *